United States Patent
Kimura (10) Patent No.: US 9,824,016 B2
(45) Date of Patent: Nov. 21, 2017

(54) DEVICE AND PROCESSING METHOD (71) Applicant: FUJITSU LIMITED, Kawasaki-shi, Kanagawa (JP)

(72) Inventor: Shigeru Kimura, Hachiouji (JP)

(73) Assignee: FUJITSU LIMITED, Kawasaki (JP)

( * ) Notice: Subject to any disclaimer, the term of this patent is extended or adjusted under 35 U.S.C. 154(b) by 138 days.

(21) Appl. No.: 14/992,435

(22) Filed: Jan. 11, 2016

(65) Prior Publication Data

US 2016/0203081 A1  Jul. 14, 2016

(30) Foreign Application Priority Data

Jan. 14, 2015  (JP) .................. 2015-005010

(51) Int. Cl.
*G06F 12/00* (2006.01)
*G06F 12/0862* (2016.01)

(52) U.S. Cl.
CPC .... *G06F 12/0862* (2013.01); *G06F 2212/602* (2013.01)

(58) Field of Classification Search
None
See application file for complete search history.

(56) References Cited

U.S. PATENT DOCUMENTS

| 8,069,310 B1* | 11/2011 | Levin-Michael ... G06F 12/0862 711/137 |
| 2011/0161631 A1 | 6/2011 | Yamazaki et al. |
| 2014/0297956 A1* | 10/2014 | Ishinaka ............. G06F 12/0862 711/119 |
| 2016/0203081 A1* | 7/2016 | Kimura ............... G06F 12/0862 711/125 |

FOREIGN PATENT DOCUMENTS

| JP | 2002-024007 | 1/2002 |
| JP | 2003-223359 | 8/2003 |
| JP | 2011-150691 | 8/2011 |

* cited by examiner

*Primary Examiner* — Brian Peugh
(74) *Attorney, Agent, or Firm* — Staas & Halsey LLP (57) ABSTRACT

A device includes, a memory, and, a processor coupled to the memory, including a cache memory, and configured, to hold a memory access instruction for executing an access to the memory and a prefetch instruction for executing a prefetch to the memory, to determine whether or not data which is a subject data of the memory access instruction is held in the cache memory, and when the data is held in the cache memory and when a corresponding prefetch instruction that is a prefetch instruction corresponding to the memory access instruction is held in the processor, not to execute an execution of the corresponding prefetch instruction.

10 Claims, 6 Drawing Sheets

DEVICE AND PROCESSING METHOD

CROSS-REFERENCE TO RELATED APPLICATION

This application is based upon and claims the benefit of priority of the prior Japanese Patent Application No. 2015-005010, filed on Jan. 14, 2015, the entire contents of which are incorporated herein by reference.

FIELD

The embodiments discussed herein are related to a device and a processing method.

BACKGROUND

An arithmetic processing unit, such as a central processing unit (CPU) and the like, includes a decoding section that decodes an instruction, an arithmetic section that executes an arithmetic operation, based on the decoded instruction, and a cache memory provided between the arithmetic section and a main memory. The arithmetic section executes an arithmetic operation with reference to data stored in the main memory or the cache memory. The cache memory holds a part of data stored in the main memory.

The arithmetic processing unit refers to data stored in the cache memory that is provided in the same semiconductor device as that in which the arithmetic processing unit is provided, and which is operated by the same clock, and thus, a waiting time in referring to data may be reduced, as compared to when the arithmetic processing unit refers to data stored in the main memory. That is, the arithmetic processing unit executes prefetch in which reference target data stored in the main memory is fetched to the cache memory in advance, and thereby, a waiting time in referring data may be reduced.

As methods for realizing prefetch, prefetch (software prefetch) using a software and a prefetch (hardware prefetch) using a hardware are known. In software prefetch, in converting a source program to an object program that may be executed by the arithmetic processing unit, a compiler device that complies a program inserts a prefetch instruction for executing prefetch in the object program. Then, the arithmetic processing unit executes prefetch, based on the prefetch instruction.

On the other hand, in hardware prefetch, a hardware, such as a hardware prefetch mechanism and the like, is provided in the arithmetic processing unit. For example, if it is determined that a memory access an access destination of which regularly changes is executed, the hardware prefetch mechanism predicts data that is accessed next and fetches data stored in the main memory in advance. Japanese Laid-open Patent Publication No. 2003-223359, Japanese Laid-open Patent Publication No. 2011-150691, and Japanese Laid-open Patent Publication No. 2002-24007 discuss related art.

SUMMARY

According to an aspect of the invention, a device includes, a memory, and, a processor coupled to the memory, including a cache memory, and configured, to hold a memory access instruction for executing an access to the memory and a prefetch instruction for executing a prefetch to the memory, to determine whether or not data which is a subject data of the memory access instruction is held in the cache

2 memory, and when the data is held in the cache memory and when a corresponding prefetch instruction that is a prefetch instruction corresponding to the memory access instruction is held in the processor, not to execute an execution of the corresponding prefetch instruction.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The address of an area in which data to which an arithmetic processing unit refers is stored is determined at the time of execution of a program. Therefore, in a stage in which a source program is converted to an object program, a compiler device is not capable of determining whether or not a prefetch instruction is given. For example, there is a case where a prefetch instruction for data stored in a cache memory is inserted to the object program. In this case, it is likely that an extra prefetch instruction for fetching the data stored in the cache memory from a main memory to the cache memory again is executed, the number of instructions increased, and reduction in performance, such as reduction in transfer speed due to increase in bath consumption amount, and the like, is caused. That is, when an extra prefetch instruction is executed, the performance of the arithmetic processing unit is likely to be reduced.

Figure 1:
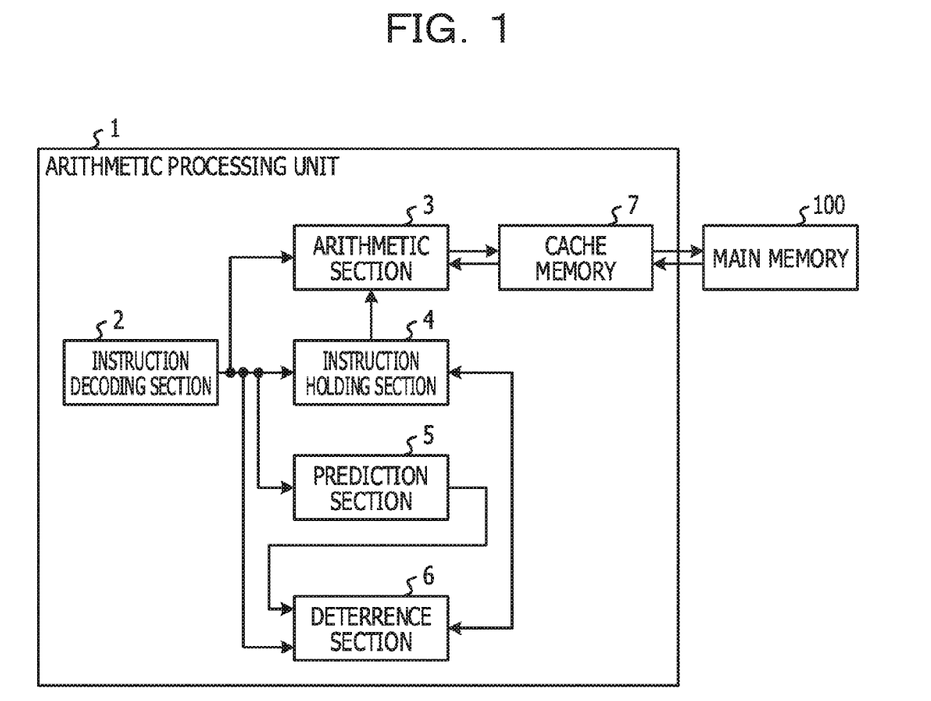
FIG. 1 is a diagram illustrating an embodiment related to an arithmetic processing unit and a control method of the arithmetic processing unit.

FIG. 1 is a diagram illustrating an embodiment related to an arithmetic processing unit and a control method of the arithmetic processing unit. An arithmetic processing unit 1 according to this embodiment is a processor, such as a CPU and the like, which executes prefetch in which data stored in a main memory 100 is transferred to a cache memory 7.

As a method for realizing prefetch, software prefetch is used. Note that, as a method for realizing prefetch, both of software prefetch and hardware prefetch may be used.

In software prefetch, a prefetch instruction for causing the cache memory 7 to hold the data stored in the main memory 100 is generated in performing compiling processing in which a source program is converted to an object program that may be executed by the arithmetic processing unit 1. Also, in compiling processing, when a prefetch instruction is generated, identification information indicating a correspondence between a memory access instruction for causing execution of a memory access to the main memory 100 and the prefetch instruction is added to each of the memory access instruction and the prefetch instruction. The identification information will be hereinafter also referred to an "identifier".

Addition of identification information may be realized by newly adding a memory access instruction with identification information or the like, and also may be realized by adding identification information to an operand of the memory access instruction or the like. An instruction to which identification information has been added will be hereinafter also referred to as an "instruction with an identifier". For example, a memory access instruction to which identification information has been added will be also referred to as a "memory access instruction with an identifier".

Memory access instructions include a load instruction for loading the data stored in the main memory 100, a store instruction for storing data in the main memory 100, and the like. A prefetch instruction may be generated so as to correspond to a load instruction, and may be generated so as to correspond to a store instruction. For example, there is a case where the arithmetic processing unit 1 executes, after loading data of an address indicating an area in which store target data is stored from the main memory 100 to the cache memory 7, a store instruction for storing data in the main memory 100 via the cache memory 7. In this case, the prefetch instruction may be generated so as to correspond to the store instruction. Note that, in order to make an operation easily understood, an operation of the arithmetic processing unit 1 and the like, which is related to the prefetch instruction, will be described below using, as an example, a prefetch instruction generated so as to correspond to a load instruction.

An object program that is executed by the arithmetic processing unit 1, data that is used in an arithmetic operation performed by the arithmetic processing unit 1, an arithmetic operation result, and the like are stored in the main memory 100. The arithmetic processing unit 1 includes an instruction decoding section 2, an arithmetic section 3, an instruction holding section 4, a prediction section 5, a deterrence section 6, and a cache memory 7. The cache memory 7 holds a part of data stored in the main memory 100.

The instruction decoding section 2 reads out an instruction from an instruction cache or the like, in which instructions are stored, and decodes a read-out instruction. Then, the instruction decoding section 2 outputs the decoded instruction to the arithmetic section 3, the instruction holding section 4, and the like. For example, the instruction decoding section 2 outputs an arithmetic instruction, such as a fixed-point arithmetic instruction, a floating-point arithmetic instruction, and the like, to the arithmetic section 3, and outputs a memory access instruction (a load instruction, a store instruction) and a prefetch instruction to the instruction holding section 4.

The arithmetic section 3 includes a load and store processing section that executes a memory access instruction, a prefetch instruction, and the like, and an arithmetic element that executes an arithmetic instruction, and the like, and executes an arithmetic operation, based on an instruction decoded by the instruction decoding section 2. For example, the arithmetic section 3 executes an arithmetic operation, based on the instruction decoded by the instruction decoding section 2, with reference to data held by the cache memory 7. Then, the arithmetic section 3 causes the cache memory 7 to hold an arithmetic operation result.

The instruction holding section 4 receives a memory access instruction that causes execution of a memory access to the main memory 100 and a prefetch instruction, among instructions decoded by the instruction decoding section 2, from the instruction decoding section 2. Then, the instruction holding section 4 holds the memory access instruction and the prefetch instruction received from the instruction decoding section 2.

The prediction section 5 predicts whether or not the memory access instruction decoded by the instruction decoding section 2 is a target memory access instruction for data held in the cache memory 7. For example, the prediction section 5 predicts whether or not a cache hit occurs for a memory access in accordance with a prediction target memory access instruction, based on a history indicating whether a cache hit or a cache miss has occurred for each of memory accesses in accordance with a plurality of memory access instructions that have been executed. The history indicating whether a cache hit or a cache miss has occurred for the memory accesses will be hereinafter also referred to as a "cache history".

If a corresponding prefetch instruction that is a prefetch instruction corresponding to a target memory access instruction that has been predicted to be an access instruction for data held in the cache memory 7 exists in the instruction holding section 4, the deterrence section 6 deters execution of the corresponding prefetch instruction by the arithmetic section 3. That is, if the instruction holding section 4 holds a corresponding prefetch instruction that is a prefetch instruction corresponding to a target memory access instruction predicted by the prediction section 5, the deterrence section 6 deters execution of the corresponding prefetch instruction by the arithmetic section 3.

In this case, for example, if the source program includes a load instruction A for loading data A and a load instruction B for loading data B, a prefetch instruction B corresponding to the load instruction B and a prefetch instruction A corresponding to the load instruction A are generated at the time of performing compiling processing. Due to execution of a prefetch instruction, data corresponding to a single cache line including an address obtained by adding a predetermined address amount to an address indicating a storage destination of data that is loaded in accordance with a load instruction corresponding to the prefetch instruction is loaded to the cache memory 7 from the main memory 100.

Therefore, for example, if the predetermined address amount is an integral multiple of the address amount corresponding to the capacity of a single cache line, the prefetch instruction corresponding to a memory access instruction for which it has been predicted that a cache hit occurs for a memory access is an extra prefetch instruction. For example, if the predetermined address amount is an integral multiple of the address amount corresponding to the capacity of a single cache line and the data A and the data B are held in the same cache line, the same data is loaded by the prefetch instruction B and the prefetch instruction A.

Thus, the arithmetic processing unit 1 determines that execution of the prefetch instruction corresponding to a memory access instruction for which it has been predicted that a cache hit occurs for a memory access is an extra prefetch instruction and deters execution of the extra prefetch instruction. Note that, if the extra prefetch instruction is executed, it is likely that the number of instructions is increased and reduction in performance, such as reduction in transfer speed due to increase in bath consumption amount, and the like, is caused. That is, when the extra prefetch instruction is executed, the performance of the arithmetic processing unit is likely to be reduced. The arithmetic processing unit 1 may deter execution of the extra prefetch instruction, and therefore, reduction in performance of the arithmetic processing unit may be reduced.

For example, the deterrence section 6 invalidates the prefetch instruction (the extra prefetch instruction) to which identification information that matches identification information added to the memory access instruction for which it has been predicted by the prediction section 5 that a cache hit occurs. Thus, execution of an extra prefetch instruction is deterred, so that a memory access in accordance with the extra prefetch instruction may be reduced. Note that the configuration of the arithmetic processing unit 1 and the control method of the arithmetic processing unit 1 are not limited to the example illustrated in FIG. 1.

As described above, in the embodiment illustrated in FIG. 1, the arithmetic processing unit 1 determines that a prefetch instruction corresponding to a memory access instruction for which it has been predicted that a cache hit occurs is an extra prefetch instruction, and deters execution of the extra prefetch instruction. Thus, in the embodiment illustrated in FIG. 1, a memory access in accordance with the extra prefetch instruction may be reduced. As a result, in the embodiment illustrated in FIG. 1, reduction in performance of the arithmetic processing unit may be reduced.

Figure 2:
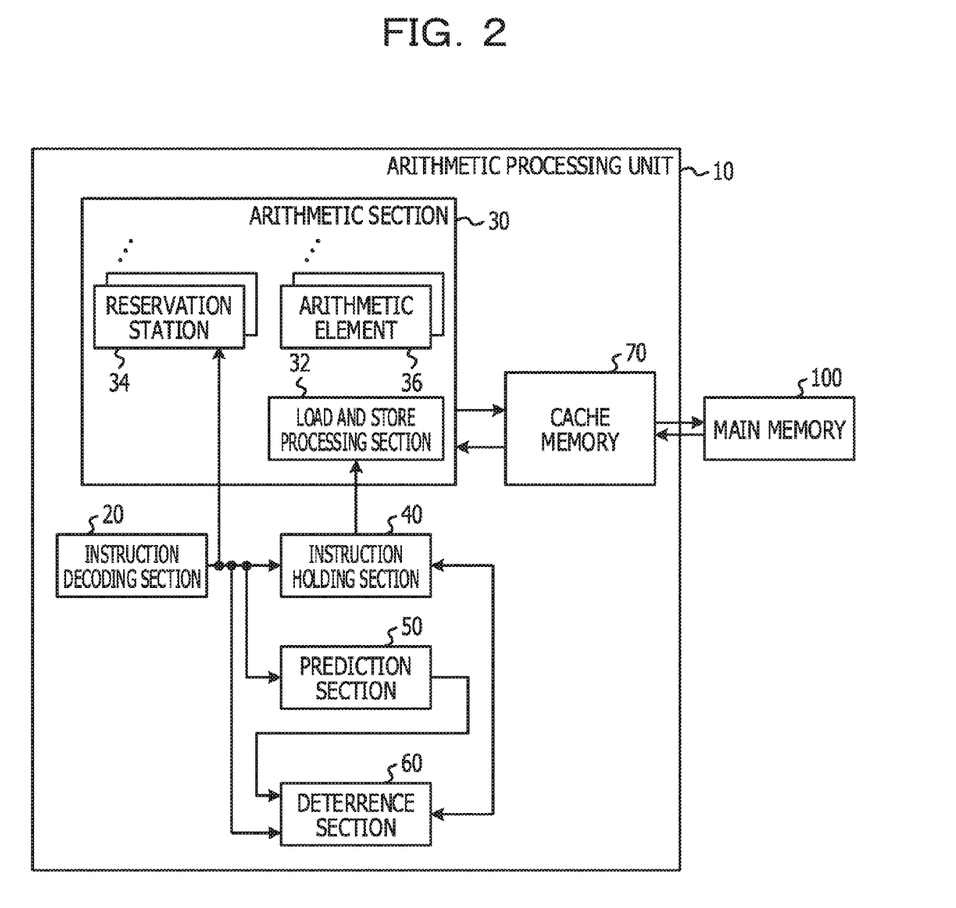
FIG. 2 is a diagram illustrating another embodiment related to an arithmetic processing unit and a control method of the arithmetic processing unit.

FIG. 2 is a diagram illustrating another embodiment related to an arithmetic processing unit and a control method of the arithmetic processing unit. Each part which is similar to or the same as the corresponding part described in FIG. 1 is denoted by the same or similar reference character, and the detailed description thereof will be omitted. An arithmetic processing unit 10 according to this embodiment is a processor, such as a CPU and the like, which executes prefetch in which data stored in a main memory 100 is transferred to a cache memory 70. As a method for realizing prefetch, software prefetch is used. Note that, as a method for realizing prefetch, both of software prefetch and hardware prefetch may be used.

The arithmetic processing unit 10 includes an instruction decoding section 20, an arithmetic section 30, an instruction holding section 40, a prediction section 50, a deterrence section 60, and a cache memory 70. The instruction decoding section 20, the arithmetic section 30, the instruction holding section 40, the prediction section 50, the deterrence section 60, and the cache memory 70 are the same as or similar to the instruction decoding section 2, the arithmetic section 3, the instruction holding section 4, the prediction section 5, the deterrence section 6, and the cache memory 7, respectively. For example, the cache memory 70 holds a part of data stored in the main memory 100.

The instruction decoding section 20 reads out an instruction from an instruction cache or the like, in which instructions are stored, decodes a read-out instruction, and registers a decoded instruction to a port (a reservation station 34, an instruction holding section 40, and the like) used for each instruction processing. For example, the instruction decoding section 20 decodes a memory access instruction and a prefetch instruction to which identification information indicating a correspondence between the memory access instruction and the prefetch instruction is added. Then, the instruction decoding section 20 records the memory access instruction and the prefetch instruction that have been decoded to the instruction holding section 40.

Figure 4:
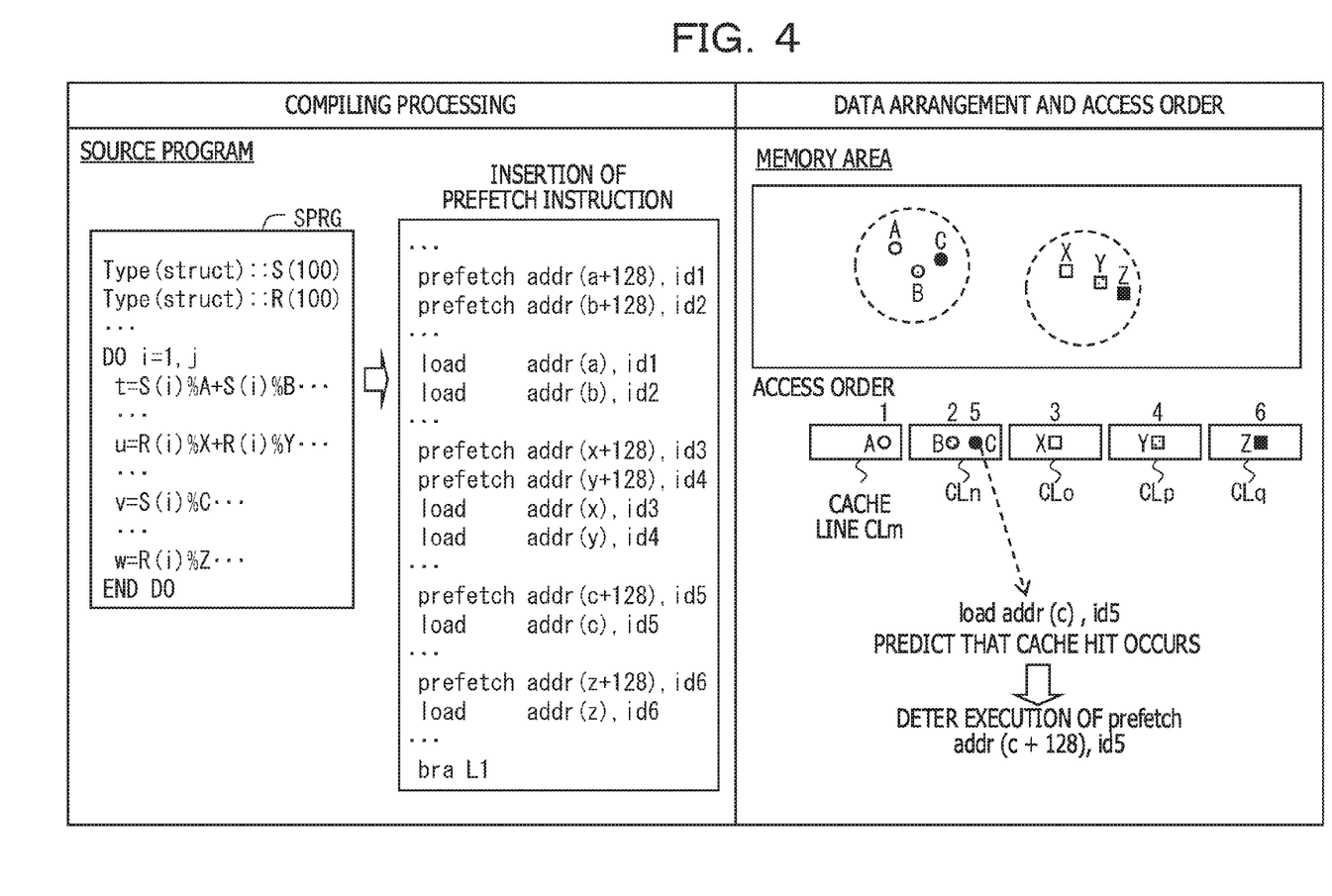
FIG. 4 is a diagram illustrating an example of a case where execution of an extra prefetch instruction is deterred.

Also, when the instruction decoding section 20 decodes an instruction with an identifier, the instruction decoding section 20 extracts a program counter value indicating a storage destination of the instruction with an identifier, a logical address indicating a storage destination of access target data, identification information (an identifier), and the like. The program counter value and the identification information are reported to each of the prediction section 50 and the deterrence section 60. Note that, as illustrated in FIG. 4, the identification information is added to each of the memory access instruction and the prefetch instruction in compiling processing.

The arithmetic section 30 includes a load and store processing section 32, a plurality of reservation stations 34, and a plurality of arithmetic elements 36, and executes an arithmetic operation, based on an instruction decoded by the instruction decoding section 20. The load and store processing section 32 receives a memory access instruction (a load instruction, a store instruction) and a prefetch instruction from the instruction holding section 40, and executes data access processing, based on the instructions received from the instruction holding section 40. The data access processing is processing of loading data, storing data, prefetch, and the like.

The plurality of reservation stations 34 are provided so as to correspond to the plurality of arithmetic elements 36. Each of the reservation stations 34 receives an arithmetic instruction (a fixed-point arithmetic instruction, a floating-point arithmetic instruction, or the like) among instructions decoded by the instruction decoding section 20, and holds the arithmetic instruction received from the instruction decoding section 20. Then, the reservation station 34 outputs the arithmetic instruction in an executable state to the corresponding one of the arithmetic elements 36. Each of the arithmetic elements 36 executes an arithmetic operation, based on the arithmetic instruction received from the corresponding one of the reservation stations 34, with reference to data held in the cache memory 70. Then, the arithmetic element 36 causes the cache memory 70 to hold an arithmetic result.

The instruction holding section 40 holds the memory access instruction that causes execution of a memory access to the main memory 100 and the prefetch instruction, among the instructions decoded by the instruction decoding section 20. The instruction holding section 40 may be used as a buffer that is used in changing the order of data access processing performed by the load and store processing section 32. That is, the instruction holding section 40 may be used as a reservation station. If data access processing performed by the load and store processing section 32 is executed in another pipe line from that of arithmetic operations performed by the arithmetic elements 36, data access processing that is not in a dependent relationship with the arithmetic operations performed by the arithmetic elements 36 may be executed in parallel to the arithmetic operations performed by the arithmetic elements 36. Note that details of the instruction holding section 40, the prediction section 50, and the deterrence section 60 will be described later with reference to FIG. 3.

The configuration of the arithmetic processing unit 10 and the control method of the arithmetic processing unit 10 are not limited to the example illustrated in FIG. 2. For example, the arithmetic processing unit 10 may include a plurality of instruction holding sections 40. Also, the instruction holding section 40 may be provided in the arithmetic section 30. An instruction holding section exclusively used for prefetch instruction may be provided.

Figure 3:
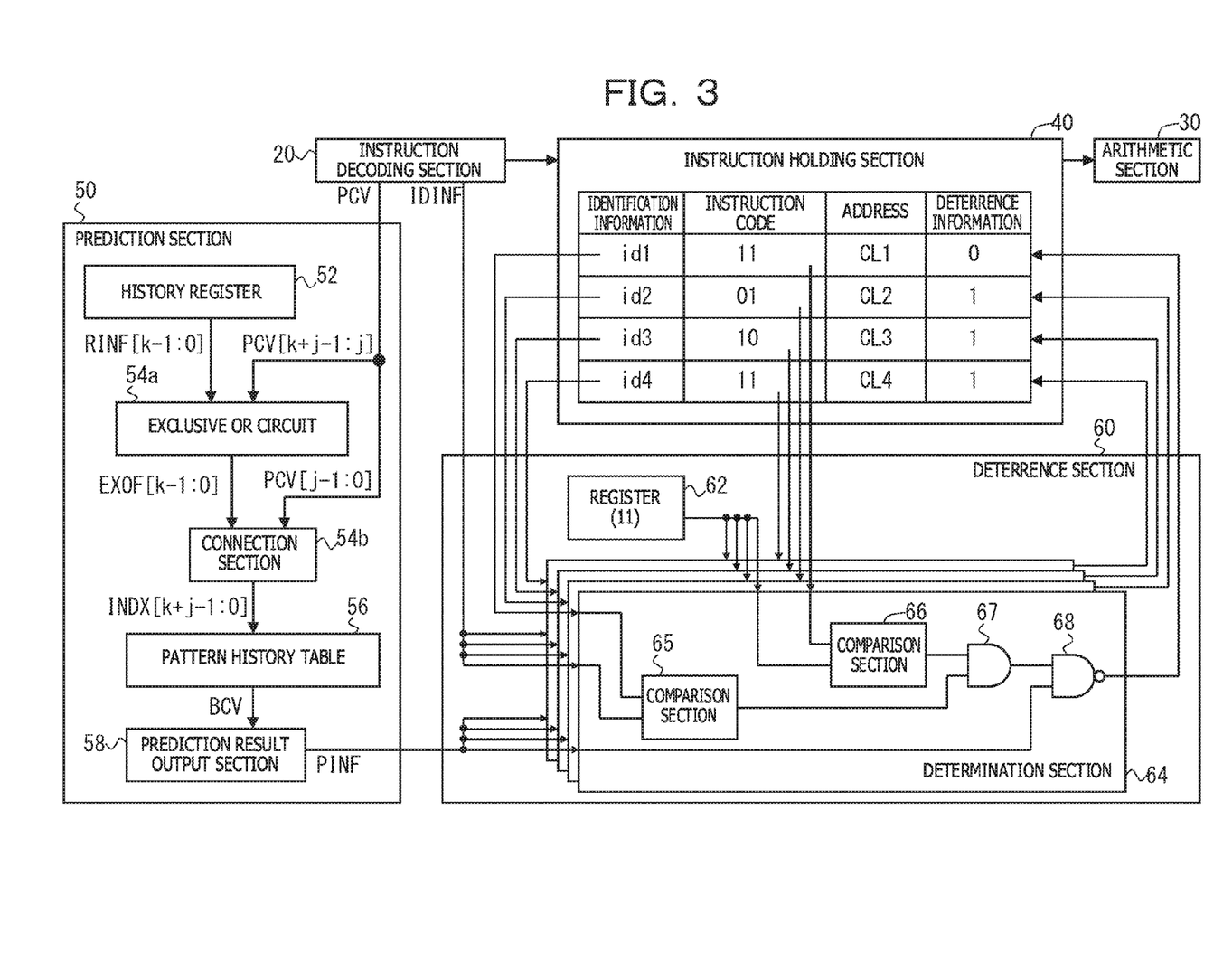
FIG. 3 is a diagram illustrating an example including an instruction holding section, a prediction section, and a deterrence section illustrated in FIG. 2.

FIG. 3 is a diagram illustrating an example including the instruction holding section 40, the prediction section 50, and the deterrence section 60 illustrated in FIG. 2.

The instruction holding section 40 is a buffer of a queue structure that holds a plurality of instructions, such as a load instruction, a store instruction, a prefetch instruction, and the like. For example, the instruction holding section 40 stores identification information indicating a correspondence between a memory access instruction and a prefetch instruction, an instruction code indicating the type of an instruction, an address indicating the access destination of the instruction, and deterrence information. As described above, the instruction holding section 40 holds a prefetch instruction to which identification information is added with the identification information.

Identification information id1, identification information id2, identification information id3, and identification information id4 that are described in an identification information column of FIG. 3 indicate respective identifiers of instructions. Instruction codes "01", "10", and "11" described in an instruction code column of FIG. 3 indicate a load instruction, a store instruction, and a prefetch instruction, respectively. Addresses "CL1", "CL2", "CL3", and "CL4" described in an address column of FIG. 3 indicate cache lines to which an access is made in accordance with load instructions or the like. Logical values "0" and "1" described in a deterrence information column of FIG. 3 indicate whether an instruction held in the instruction holding section 40 is valid or invalid. For example, an instruction deterrence information of which has been set to the logical value "0" is an invalid instruction and is not executed.

For example, the arithmetic processing unit 10 selects an instruction held in an area designated by a pointer (which will be hereinafter also referred to as a "read-out pointer") used for reading, among instructions held in the instruction holding section 40, and accesses data in accordance with the selected instruction. A memory access instruction or a prefetch instruction is newly registered in the area in which the instruction of which access processing has been executed. The area in which a memory access instruction or a prefetch instruction is newly held is designated by a pointer (which will be hereinafter also referred to as a write-in pointer) used for writing.

The value of the read-out pointer is updated each time an instruction held in an area designated by the read-out pointer is executed. In this case, an instruction the deterrence information of which has been set to the logical value "0" is skipped. In an area in which the instruction that has been skipped as a result of setting the deterrence information to the logical value "0" was held, a memory access instruction or a prefetch instruction is newly registered.

The prediction section 50 includes a history register 52, an exclusive OR circuit 54a, a connection section 54b, a pattern history table 56, and a prediction result output section 58. Note that j and k indicated in square brackets given to signals in the prediction section 50 are positive integers.

The history register 52 is an example of a cache history register section that holds history information RINF indicating whether a cache hit or a cache miss has occurred for each of memory accesses in accordance with a plurality of memory access instructions that have been executed. In the example of FIG. 3, the history register 52 is a k-stage shift register and holds history information RINF [k−1:0] for memory access instructions for last k times. The history information RINF held in a holding section (for example, a flip-flop) of each stage of the shift register shifts by one each time a memory access instruction is executed. History information RINF [0] held in a holding section (for example, a flip-flop) of a first stage of the history register 52 is history information for a latest memory access in history information RINF [k−1:0] held in the history register 52.

The exclusive OR circuit 54a and the connection section 54b are of an example of an index generation section that generates an index, based on a program counter value PCV indicating an address in which a memory access instruction is stored and the history information RINF. The exclusive OR circuit 54a receives k bit history information RINF [k−1:0] from the history register 52, and a k bit program counter value PCV [k+j−1: j] from the instruction decoding section 20. Then, the exclusive OR circuit 54a performs an exclusive OR operation between the history information RINF [k−1:0] and the program counter value PCV [k+j−1:j], and outputs an arithmetic operation result EXOF [k−1:0] to the connection section 54b. Note that the program counter value PCV [k+j−1:j] is data of the "k+j−1"th bit from the jth bit of the program counter value PCV (the 0th bit thereof is the lowest bit) indicating an address in which a memory access instruction is stored.

The connection section 54b receives the k bit arithmetic operation result EXOF [k−1:0] from the exclusive OR circuit 54a, and receives the j bit program counter value PCV [j−1:0] from the instruction decoding section 20. Then, the connection section 54b connects the arithmetic operation result EXOF [k−1:0] and the program counter value PCV [j−1:0] to generate a "k+j" bit index INDX [k+j−1:0]. Upper k bits of the index INDX [k+j−1:0] is the arithmetic operation result EXOF [k−1:0], and lower j bits of the index INDX [k+j−1:0] is the program counter value PCV [j−1:0]. Note that the program counter value PCV [j−1:0] is data of the "j−1"th bit from the 0th bit of the program counter value PCV indicating an address in which a memory access is stored.

The pattern history table 56 is an example of a pattern holding section that holds a prediction pattern information BCV indicating the frequency of cache hit for each index INDX. The pattern history table 56 includes, for example, a two-bit saturation counter for each index INDX, and holds the value of the saturation counter as prediction pattern information BCV for each index INDX. The value of the two bit saturation counter changes to one of four states "00", "01", "10", and "11" in accordance with a result of whether a cache hit or a cache miss has occurred for a memory access instruction.

For example, the counter value "00" indicates a first cache miss state, and the counter value "01" indicates a second cache miss state in which a probability that a cache miss occurs is lower than that in the first cache miss state. The counter value "10" indicates the second cache hit state, and the counter value "11" indicates the first cache hit state in which a probability that a cache hit occurs is higher than that in the second cache hit state.

In this case, the value of the two bit saturation counter counts up by one each time a cache hit occurs for a memory access instruction, and counts down by one each time a cache miss occurs for a memory access instruction. Note that, if the value of the two bit saturation counter is "00", the value of the two bit saturation counter is maintained to be "00" even when a cache miss for the memory access instruction has occurred. If the value of the two bit saturation counter is "11", the value of the two bit saturation counter is maintained to be "11" even when a cache hit for the memory access instruction has occurred.

As described above, each time a memory access instruction is executed, the value of the prediction pattern information BCV corresponding to the index INDX generated using the program counter value PCV of the memory access instruction that is executed is updated by the two bit saturation counter.

The prediction result output section 58 receives the prediction pattern information BCV corresponding to a prediction target memory access instruction, among pieces of the prediction pattern information BCV held in the pattern history table 56. That is, the prediction result output section 58 receives the prediction pattern information BCV corresponding to the index INDX generated using the program counter value PCV of the prediction target memory access instruction from the pattern history table 56. Then, the prediction result output section 58 outputs prediction result information PINF indicating whether or not the prediction target memory access instruction is a target memory access instruction to the deterrence section 60, based on the prediction pattern information BCV received from the pattern history table 56.

Note that, as illustrated in FIG. 1, the target memory access instruction is a memory access instruction for data held in the cache memory 70. That is, the target memory access instruction is a memory access instruction for which a cache hit occurs.

For example, if the prediction pattern information BCV indicates the first cache hit state (BCV=11) or the second cache hit state (BCV=10), the prediction result output section 58 outputs the prediction result information PINF of the logical value "1" to the deterrence section 60. The prediction result information PINF of the logical value "1" indicates that it has been predicted that the prediction target memory access instruction is a target memory access instruction. If the prediction pattern information BCV indicates the first cache miss state (BCV=00) or the second cache miss state (BCV=01), the prediction result output section 58 outputs the prediction result information PINF of the logical value "0" to the deterrence section 60. The prediction result information PINF of the logical value "0" indicates that it has been predicted that the prediction target memory access instruction is not a target memory access instruction.

The deterrence section 60 includes a register 62 and a plurality of determination sections 64. An instruction code "11" indicating a prefetch instruction that is an invalidation target is set to the register 62. Setting of the instruction code ("11" in FIG. 3) to the register 62 may be executed once, for example, at the time of execution of compiling processing or at a runtime.

The plurality of determination sections 64 update each of a plurality of pieces of deterrence information that correspond to a plurality of instructions held in the instruction holding section 40. Each of the determination sections 64 includes comparison sections 65 and 66, an AND circuit 67, and a NAND circuit 68.

If the instruction decoding section 20 decodes a memory access instruction (a load instruction or a store instruction) with identification information IDINF, the comparison section 65 receives the identification information IDINF that has been added to the memory access instruction from the instruction decoding section 20. Then, the comparison section 65 compares identification information (for example, id1) held in a corresponding area of the instruction holding section 40 and the identification information IDINF received from the instruction decoding section 20 to each other, and outputs a comparison result to the AND circuit 67. If the identification information held in the instruction holding section 40 matches the identification information IDINF received from the instruction decoding section 20, the logical value "1" is output as the comparison result to the AND circuit 67. If the identification information held in the instruction holding section 40 does not match the identification information IDINF received from the instruction decoding section 20, the logical value "0" is output as the comparison result to the AND circuit 67.

The comparison section 66 compares an instruction code (for example, "11") held in a corresponding area in the instruction holding section 40 and an instruction code (for example, "11") that has been set to the register 62 to each other, and outputs a comparison result to the AND circuit 67. If the instruction code held in the instruction holding section 40 matches the instruction code that has been set to the register 62, the logical value "1" is output as the comparison result to the AND circuit 67. If the instruction code held in the instruction holding section 40 does not match the instruction code that has been set to the register 62, the logical value "0" is output as the comparison result to the AND circuit 67.

The AND circuit 67 performs a logical AND operation between a signal received from the comparison section 65 and a signal received from the comparison section 66, and outputs an operation result to the NAND circuit 68. That is, if a prefetch instruction to which identification information that matches the identification information IDINF transferred from the instruction decoding section 20 to the deterrence section 60 has been added exists in the instruction holding section 40, the AND circuit 67 outputs the logical value "1" to the NAND circuit 68.

The NAND circuit 68 receives the prediction result information PINF from the prediction section 50 (more specifically, from the prediction result output section 58). Then, the NAND circuit 68 performs a NAND operation between the prediction result information PINF received from the prediction section 50 and a signal received from the AND circuit 67, and outputs an operation result to the instruction holding section 40. Thus, among pieces of deterrence information held in the instruction holding section 40, deterrence information held in an area corresponding to the determination section 64 is updated to the logical value indicated by the operation result of the NAND circuit 68.

As described above, if a corresponding prefetch instruction to which identification information corresponding to the identification information IDINF that has been added to the target memory access instruction has been added exists in the instruction holding section 40, the deterrence section 60 deters execution of the corresponding prefetch instruction by the arithmetic section 30.

Note that the configurations of the instruction holding section 40, the prediction section 50, and the deterrence section 60 are not limited to those of the example illustrated in FIG. 3. For example, as for the pattern history table 56 of the prediction section 50, prediction pattern information BCV may be updated by a method other than the two-bit saturation counter. Also, the prediction section 50 may predict, based on cyclical change in cache hit or cache miss, whether or not the prediction target memory access instruction is a target memory access instruction. As another option, the prediction section 50 may predict, based on the history (local history) of a memory access instruction of the same program counter value PCV as that of the prediction target memory access instruction, whether or not the prediction target memory access instruction is a target memory access instruction.

Also, for example, the register 62, the comparison section 66, and the AND circuit 67 may be omitted from the deterrence section 60. In a normal operation, the identification information IDINF added to a memory access instruction is allocated so as not to overlap with identification information added to the memory access instruction that exists in the instruction holding section 40. Thus, in a normal operation, it may be determined that, among instructions that exist in the instruction holding section 40, an instruction to which identification information that matches the identification information IDINF that has been transferred from the instruction decoding section 20 to the deterrence section 60 has been added is a prefetch instruction.

Also, if there is a chance to deter execution of an extra prefetch instruction in a stage (for example, in a stage in which an instruction is decoded) before a stage in which an instruction is held in the instruction holding section 40, execution of the extra prefetch instruction may be deterred in the stage before the instruction is held in the instruction holding section 40.

FIG. 4 is a diagram illustrating an example of a case where execution of an extra prefetch instruction is deterred. In the example of FIG. 4, the capacity of each cache line CL (CLm, CLn, CLo, CLp, and CLq) of the cache memory 70 is 128 bytes. Data A, data B, and data C are elements of a structure S, and are arranged in memory areas that are close to each other. Data X, data Y, and data Z are elements of a structure R, and are arranged in memory areas that are close to each other. A source program SPRG is a program that causes the plurality of elements A, B, and C of the structure S and the plurality of elements X, Y, and Z of the structure R access one another in the same loop.

The addresses of areas in which the data A, the data B, the data C, the data X, the data Y, and the data Z are stored are determined at the time of execution of a program (an object program to which the source program SPRG has been converted). Therefore, in a stage in which the source program is converted to an object program, the compiler device does not know on which cache line CL each of the data A, the data B, the data C, the data X, the data Y, and the data Z is arranged. Therefore, the compiler device inserts a prefetch instruction (prefetch) corresponding to each of load instructions (load) of the data A, the data B, the data C, the data X, the data Y, and the data Z in the object program.

Also, the compiler device adds identification information (for example, id1) indicating a correspondence between the load instruction and the prefetch instruction to the load instruction and the prefetch instruction. Data of an insertion target of the prefetch instruction may be designated by an optimization control line, a programmer, or the like, which gives an instruction to the compiler device. The optimization control line is used in FORTRAN, and a programmer is used in the C language, or the like. A user may describe an optimization control line (for example, "!ocl prefetch_cancel_bypredict(S)"), which designates, as data of an insertion target of a prefetch instruction, an element in the structure S in the source program SPRG. Note that insertion of the prefetch instruction may be designated by a translation option (for example, "-Kprefetch_cancel_bypredict").

In this case, in the example of FIG. 4, the data B and the data C are arranged in the same cache line CLn. Each data is accessed in the order of the data A, the data B, the data X, the data Y, the data C, and the data Z. The data A, the data B, the data X, and the data Y are arranged on different cache lines CL, and therefore, a cache miss occurs for the first one of random accesses. In this case, each of prefetch instructions that correspond to load instructions of the data A, the data B, the data X, and the data Y is an valid prefetch instruction.

The data C is arranged in the same cache line CLn as that on which the data B is arranged, and therefore, a cache hit occurs. In this case, a prefetch instruction (prefetch addr (c+128), id5) corresponding to the load instruction (load addr (c), id5) of the data C is an extra prefetch instruction. Therefore, the deterrence section 60 deters execution of the extra prefetch instruction (prefetch addr (c+128), id5).

If the data A, the data B, and the data C of the structure S are repeatedly accessed, there might be a case where an address interval of the repeatedly accessed data A is not a certain interval, but an address interval between the data A, the data B, and the data C is maintained to be a certain interval. In this case, prediction of whether or not a cache hit or a cache miss occurs for an access to the data C depends on a cache history (a history regarding whether a cache hit or a cache miss has occurred) of an immediately previous load instruction (a load instruction of the data A, the data B, the data X, or the data Y). For example, as illustrated in FIG. 3, the prediction section 50 predicts, using the history register 52 that holds the cache history (the history information RINF), and the like, whether a cache hit or a cache miss occurs for an access to the data C.

In the example of FIG. 4, the prediction section 50 predicts that a cache hit occurs for an access in accordance with the load instruction (load addr (c), id5) of the data C. Therefore, the deterrence section 60 sets deterrence information corresponding to a prefetch instruction corresponding to the load instruction of the data C, among pieces of deterrence information held in the instruction holding section 40, to the logical value "0" (a logical value indicating invalid). Thus, execution of the extra prefetch instruction (prefetch addr (c+128), id5) is deterred, and a memory access in accordance with the extra prefetch instruction is reduced.

Note that, even when an indirect access is made based on an array value, prediction of whether a cache hit or a cache miss occurs for a memory access depends on a cache history of an immediately previous load instruction. Therefore, even when an indirect access is made based on an array value, the arithmetic processing unit 10 may deter execution of an extra prefetch instruction, based on a prediction result of the prediction section 50.

Figure 5:
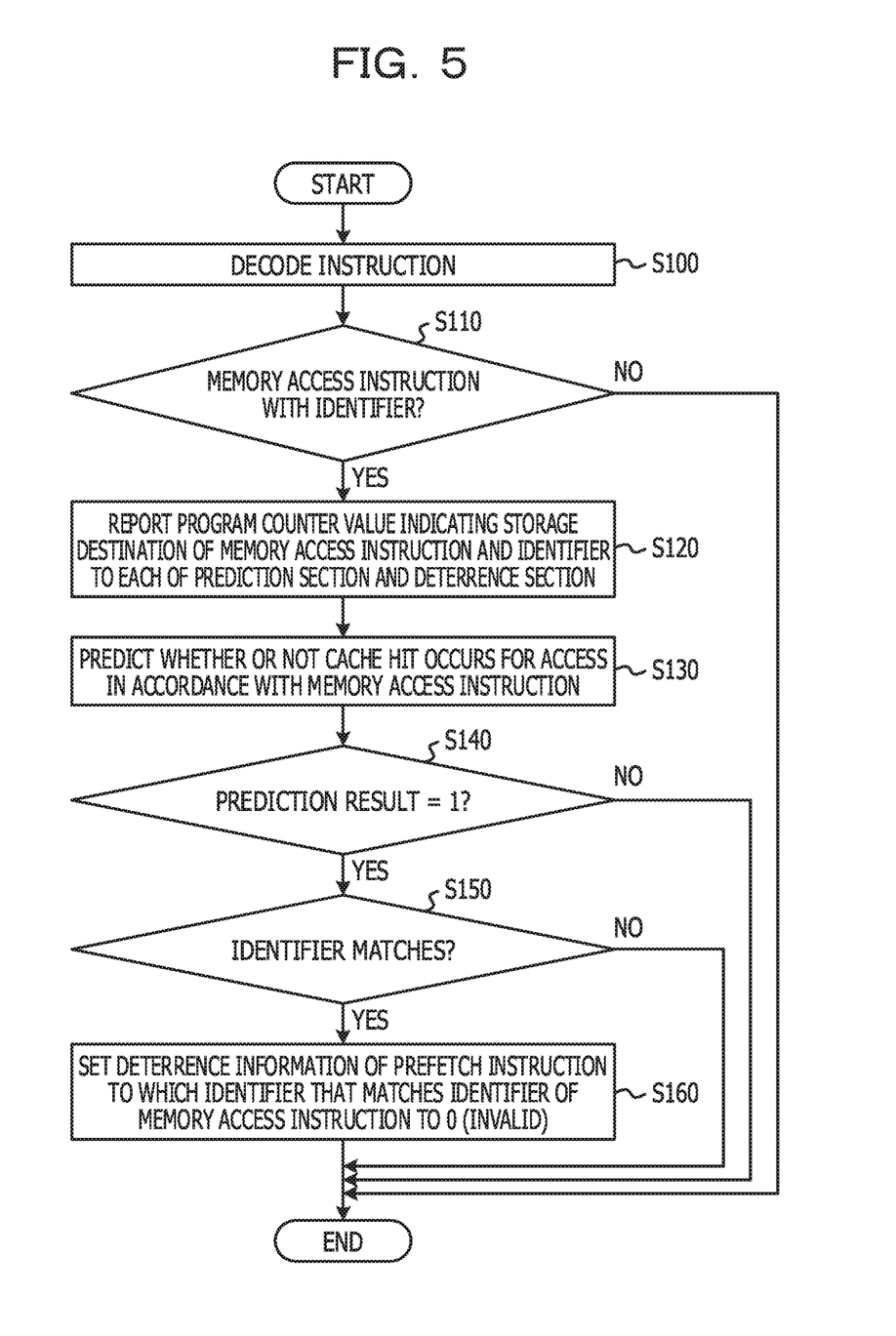
FIG. 5 is a flow chart illustrating an example of an operation of the arithmetic processing unit illustrated in FIG. 2.

FIG. 5 is a flow chart illustrating an example of an operation of the arithmetic processing unit 10 illustrated in FIG. 2. Note that FIG. 5 illustrates an embodiment related to a control method of the arithmetic processing unit 10. The operation of FIG. 5 corresponds to the operation of the arithmetic processing unit 10 in invalidating an extra prefetch instruction. The operation of FIG. 5 may be realized by only a hardware, and also may be realized by controlling a hardware by a software.

In Step S100, as illustrated in FIG. 2, the instruction decoding section 20 reads out an instruction from an instruction cache in which the instruction is stored, or the like, and decodes a read-out instruction. Thus, the program counter value PCV indicating the storage destination of the instruction, a logical address indicating the storage destination of access target data, and the like, are extracted. Note that, if an instruction with an identifier is decoded, the program counter value PCV, the logical address indicating the storage destination of the access target data, and the identification information (the identifier IDINF) are extracted.

In Step S110, the instruction decoding section 20 determines whether or not the instruction decoded in Step S100 is a memory access instruction (a load instruction with an identifier, a store instruction with an identifier) with an identifier. If the instruction decoded in Step S100 is a memory access instruction with an identifier, the operation of the arithmetic processing unit 10 moves to Step S120. On the other hand, the instruction decoded in Step S100 is not a memory access instruction with an identifier, processing (the operation of the arithmetic processing unit 10) of invalidating an extra prefetch instruction ends.

In Step S120, as illustrated in FIG. 2, the instruction decoding section 20 reports the program counter value PCV indicating the storage destination of the memory access instruction with an identifier, which has been decoded in Step S100, and the identifier IDINF to each of the prediction section 50 and the deterrence section 60.

In Step S130, as illustrated in FIG. 3, the prediction section 50 predicts whether or not a cache hit occurs for an access in accordance with the memory access instruction with an identifier, which has been decoded in Step S100. That is, the prediction section 50 predicts whether or not the memory access instruction with an identifier, which has been decoded in Step S100, is a target memory access instruction corresponding to data held in the cache memory 70. Then, the prediction section 50 reports a prediction result HINF to the deterrence section 60.

In Step S140, as illustrated in FIG. 3, the deterrence section 60 determines whether or not the prediction result HINF (a result of prediction processing of Step S130) is the logical value "1". That is, the deterrence section 60 determines whether or not it has been predicted that a cache hit occurs for an access in accordance with the memory access instruction with an identifier, which has been decoded in Step S100. If the prediction result HINF is the logical value "1" (a cache hit), the operation of the arithmetic processing unit 10 moves to Step S150. On the other hand, the prediction result HINF is not the logical value "1", processing (the operation of the arithmetic processing unit 10) of invalidating an extra prefetch instruction ends.

In Step S150, as illustrated in FIG. 3, the deterrence section 60 determines whether or not any one of identifiers (id illustrated in FIG. 3) held in the instruction holding section 40 and the identifier IDINF of the memory access instruction with an identifier, which has been decoded in Step S100, match each other. That is, the deterrence section 60 determines whether or not a corresponding prefetch instruction corresponding to the target memory access instruction that is predicted to be an access instruction for data held in the cache memory 70 exists in the instruction holding section 40.

If any one of identifiers held in the instruction holding section 40 and the identifier IDINF of the memory access instruction with an identifier match each other, the operation of the arithmetic processing unit 10 moves to Step S160. On the other hand, if the identifier IDINF of the memory access instruction with an identifier does not match any one of the identifiers held in the instruction holding section 40, processing (the operation of the arithmetic processing unit 10) of invalidating an extra prefetch instruction ends.

In Step S160, as illustrated in FIG. 3, the deterrence section 60 sets deterrence information corresponding to the prefetch instruction to which the identifier that matches the identifier IDINF of the memory access instruction with an identifier, which has been decoded in Step S100, has been added to the logical value "0" (a state indicting invalid). Thus, the extra prefetch instruction is invalidated, and execution of the extra prefetch instruction is deterred. Note that, when prediction made by the prediction section 50 (prediction in Step S130) is wrong, the prefetch instruction is merely not executed, and data is acquired in accordance with a subsequent instruction.

The operation of the arithmetic processing unit 10 is not limited to the example illustrated in FIG. 5. For example, if a plurality of prefetch instructions which cause accesses to the same cache line CL exist in the instruction holding section 40, processing (which will be hereinafter referred to also as "overlap canceling processing") of invalidating ones of the plurality of prefetch instructions other than one of the plurality of prefetch instructions may be added.

In this case, overlap canceling processing is executed, so that, for example, if pieces of data that are accessed in accordance with load instructions that are continuously executed are arranged in the same cache line CL, execution of the extra prefetch instruction is deterred. However, overlap canceling processing does not cover a case where pieces of data (for example, the data A, the data B, the data X, the data Y, the data C, the data Z, and the like, illustrated in FIG. 4) which are accessed in accordance with load instructions that are continuously executed are arranged in different cache lines CL. A case where, even when overlap canceling processing is executed, execution of the extract prefetch instruction is not deterred will be described with reference to an example of access illustrated in FIG. 4.

If there is not a period in which an extra prefetch instruction corresponding to the load instruction of the data C illustrated in FIG. 4 and prefetch instruction corresponding to the load instruction of the data B simultaneously exist in the instruction holding section 40, execution of the extra prefetch instruction is not deterred even when overlap canceling processing is executed. For example, if, before the extra prefetch instruction corresponding to the load instruction of the data C illustrated in FIG. 4 is held in the instruction holding section 40, a prefetch instruction corresponding to the load instruction of the data B is executed, execution of the extract prefetch instruction is not deterred even when overlap canceling processing is executed.

In contrast, the arithmetic processing unit 10 predicts, at the time of decoding an instruction, whether or not a cache hit occurs for an access in accordance with a memory access instruction, and detects, using identification information, an extra prefetch instruction corresponding to the memory access instruction for which it has been predicted that a cache hit occurs. Therefore, even when the extra prefetch instruction corresponding to the load instruction of the data C and the prefetch instruction corresponding to the load instruction of the data B do not simultaneously exist in the instruction holding section 40, the arithmetic processing unit 10 may deter execution of the extra prefetch instruction.

As described above, before the memory access instruction is held in the instruction holding section 40, the arithmetic processing unit 10 predicts whether or not a cache hit occurs for an access in accordance with a memory access instruction. Then, if the arithmetic processing unit 10 predicts that a cache hit occurs for the memory access instruction, the arithmetic processing unit 10 deters execution of an extra prefetch instruction corresponding to the memory access instruction for which it has been predicted that a cache hit occurs.

If a dependent relationship with data for which an area (a structure, an array, a pointer access, and the like) which has been dynamically acquired is accessed, address arrangement, and the like, are not known at the time of performing compiling processing, there might be a case where a prefetch instruction conservatively inserted at the time of performing compiling processing is an extra prefetch instruction. Even in this case, the arithmetic processing unit 10 may deter execution of the extra prefetch instruction in a data access (a random access or a continuous access) with regularity, for which it is possible to predict whether or not a cache hit occurs. Since execution of the extra prefetch instruction is automatically deterred by a hardware, a software is not restructured.

Execution of the extra prefetch instruction is deterred and proper prefetch instruction is executed, and therefore, the performance of the arithmetic processing unit 10 may be increased. For example, waste (consumption of pipeline resources, consumption of bandwidth, and the like) of hard resources due to execution of the extra prefetch instruction may be reduced, and efficiency of execution of the arithmetic processing unit 10 may be increased. Thus, a program may be speeded up.

Figure 6:
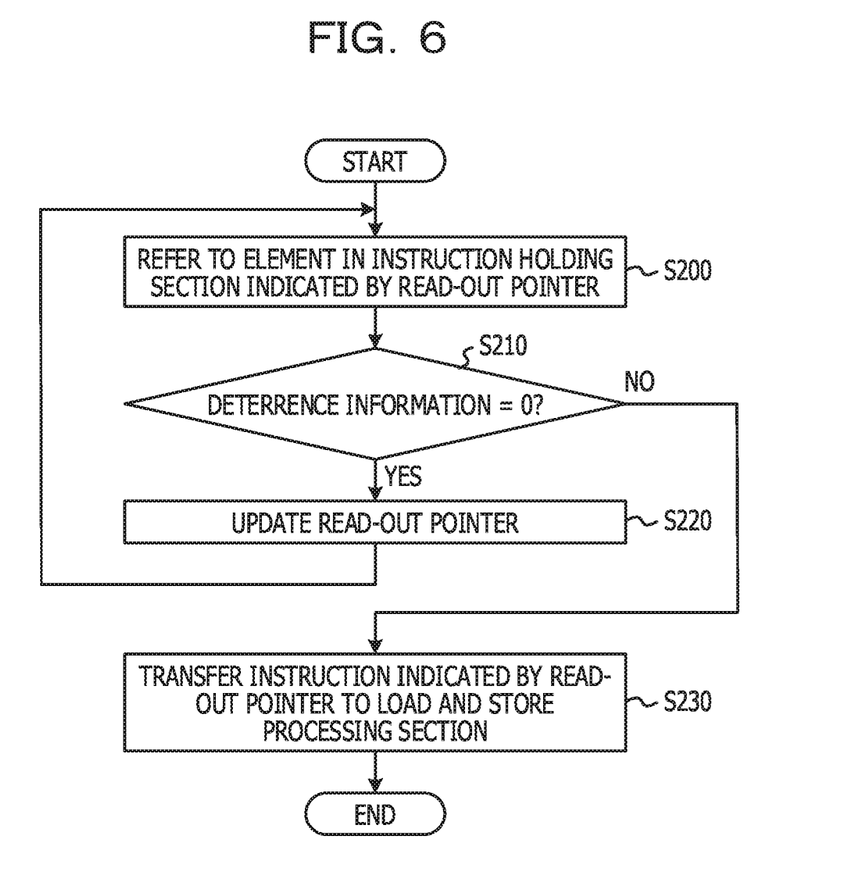
FIG. 6 is a flow chart illustrating an example of the operation of the instruction holding section illustrated in FIG. 2.

FIG. 6 is a flow chart illustrating an example of the operation of the instruction holding section 40 illustrated in FIG. 2.

In Step S200, the instruction holding section 40 refers to elements (the identification information, the instruction code, the address, and the deterrence information illustrated in FIG. 3) held in an area indicated by a read-out pointer.

In Step S210, the instruction holding section 40 determines whether or not the deterrence information to which the instruction holding section 40 has referred in Step S200 is the logical value "0" (a state indicating invalid). If the deterrence information is the logical value "0", the operation of the instruction holding section 40 moves to Step S220. On the other hand, if the deterrence information is not the logical value "0", the operation of the instruction holding section 40 moves to Step S230.

In Step S220, the instruction holding section 40 updates the read-out pointer to a value indicating an area of a next element. Then, the operation of the instruction holding section 40 returns to Step S200. That is, an instruction of which deterrence information is set to the logical value "0" is skipped. In an area in which the instruction that has been skipped as a result of setting the deterrence information to the logical value "0" was held, a memory access instruction or a prefetch instruction is newly registered.

In Step S230, the instruction holding section 40 transfers the instruction (the instruction to which the instruction holding section 40 has referred in Step S200) of the area indicated by the read-out pointer to the load and store processing section 32. Thus, data access processing is executed based on the instruction of the area indicated by the read-out pointer. In the area in which the instruction access processing of which has been executed was held, a memory access instruction or a prefetch instruction is newly registered.

The read-out pointer is updated in parallel to data access processing, and therefore, the read-out pointer is updated to a value indicating a next instruction (an element in the instruction holding section 40) without consuming a nonsense cycle, such as no operation (NOP). Thus, the instruction holding section 40 may deter delay of a timing with which data access processing is executed.

As described above, also, in the embodiment illustrated in FIG. 2 to FIG. 6, similar advantages to those of the embodiment illustrated in FIG. 1 may be achieved. For example, in the embodiment illustrated in FIG. 2 to FIG. 6, the arithmetic processing unit 10 determines that a prefetch instruction corresponding to a memory access instruction for which it has been predicted that a cache hit occurs is an extra prefetch instruction, and deters execution of the extra prefetch instruction. Thus, in the embodiment illustrated in FIG. 2 to FIG. 6, a memory access in accordance with the extra prefetch instruction may be reduced, and reduction in performance of the arithmetic processing unit may be reduced.

Also, in the embodiment illustrated in FIG. 2 to FIG. 6, an instruction of which deterrence information held in the instruction holding section 40 is set to the logical value "0" is skipped. Thus, the arithmetic processing unit 10 may execute data access processing without consuming a nonsense cycle, such as an NOP. As a result, in the embodiment illustrated in FIG. 2 to FIG. 6, delay of a timing with which data access processing is executed may be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A device comprising:
   a memory; and
   a processor including a cache memory coupled to the memory, the processor configured to:
   hold a memory access instruction to access the memory and a prefetch instruction to prefetch from the memory,
   determine whether data which is a target of the memory access instruction is held in the cache memory, and
   when the data is held in the cache memory and when a prefetch instruction corresponding to the memory access instruction is held in the processor, not execute the corresponding prefetch instruction.

2. The device according to claim 1, wherein the processor is configured to:
   add, to the memory access instruction and the prefetch instruction, identification information indicating a correspondence between the memory access instruction and the prefetch instruction,
   hold the prefetch instruction with the identification information, and
   when the data is held in the cache memory and when the corresponding prefetch instruction with the identification corresponding to the memory access instruction is held in the processor, not execute the corresponding prefetch instruction.

3. The device according to claim 1, wherein the processor is configured to:
   hold deterrence information indicating whether the prefetch instruction is valid or invalid with the prefetch instruction, and
   set, if the corresponding prefetch instruction is held in the processor, the deterrence information to a state indicating the prefetch instruction is invalid.

4. The device according to claim 1, wherein the processor is configured to:
   hold history information indicating whether a cache hit or a cache miss has occurred for each of memory accesses in accordance with a plurality of memory access instructions,
   generate an index based on a program counter value indicating an address of the cache memory in which the memory access instructions are stored and the history information,
   hold prediction pattern information indicating frequency of the cache hit, and output, based on the prediction pattern information, among pieces of the prediction pattern information that are held, which corresponds to the index generated using the program counter value of the memory access instruction that is a prediction target, prediction result information indicating whether the memory access instruction that is a prediction target is the target memory access instruction.

5. The device according to claim 1, wherein the processor is configured to:
execute the memory access instruction and the prefetch instruction.

6. A processing method using a memory and a processor including a cache memory, the method comprising:
holding a memory access instruction to access the memory and a prefetch instruction to prefetch from the memory;
determining whether data which is a target of the memory access instruction is held in the cache memory; and
when the data is held in the cache memory and when a prefetch instruction corresponding to the memory access instruction is held in the processor, not executing the corresponding prefetch instruction.

7. The processing method according to claim 6, further comprising:
adding, to the memory access instruction and the prefetch instruction, identification information indicating a correspondence between the memory access instruction and the prefetch instruction;
holding the prefetch instruction with the identification information; and
when the data is held in the cache memory and when the corresponding prefetch instruction with the identification corresponding to the memory access instruction is held in the processor, not executing the corresponding prefetch instruction.

8. The processing method according to claim 6, further comprising:
holding deterrence information indicating whether the prefetch instruction is valid or invalid with the prefetch instruction; and
setting, if the corresponding prefetch instruction is held in the processor, deterrence information to a state indicating the prefetch instruction is invalid.

9. The processing method according to claim 6, further comprising:
holding history information indicating whether a cache hit or a cache miss has occurred for each of memory accesses in accordance with a plurality of memory access instructions;
generating an index based on a program counter value indicating an address of the cache memory in which the memory access instructions are stored and the history information;
holding prediction pattern information indicating frequency of the cache hit; and
outputting, based on the prediction pattern information, among pieces of the prediction pattern information that are held, which corresponds to the index generated using the program counter value of the memory access instruction that is a prediction target, prediction result information indicating whether the memory access instruction that is a prediction target is the target memory access instruction.

10. The processing method according to claim 6, further comprising:
executing the memory access instruction and the prefetch instruction.

* * * * *